(No Model.)
D. C. STOVER.
WIRE BARBING MACHINE.
No. 301,532. Patented July 8, 1884.
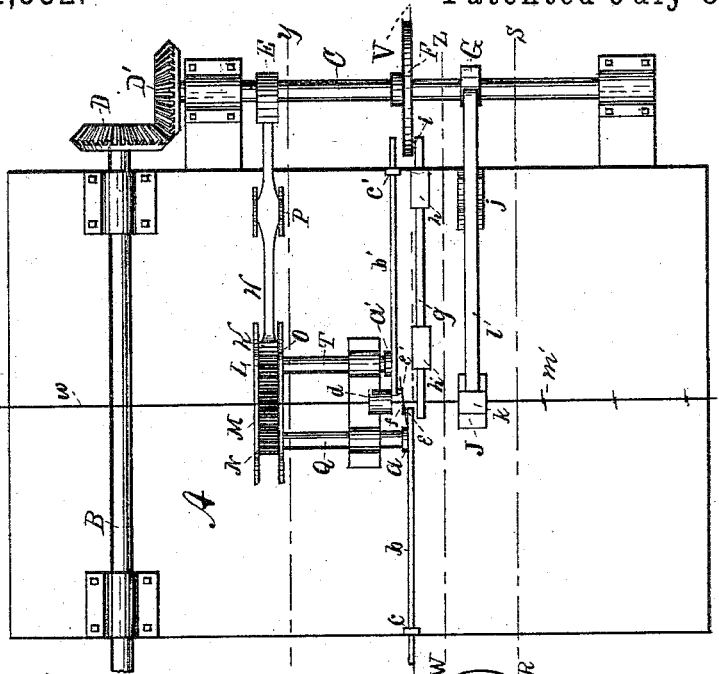
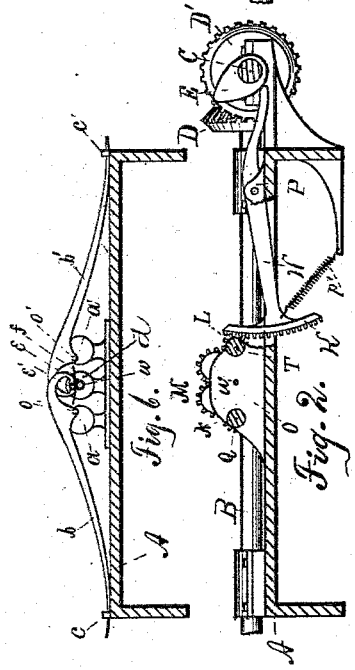
WITNESSES:
Wallace A. Greene
Oscar Taylor
INVENTOR
Daniel C. Stover
by Robt. H. Wiles
ATTORNEY

UNITED STATES PATENT OFFICE.

DANIEL C. STOVER, OF FREEPORT, ILLINOIS.

WIRE-BARBING MACHINE.

SPECIFICATION forming part of Letters Patent No. 301,532, dated July 8, 1884.

Application filed April 24, 1883. (No model.)

*To all whom it may concern:*

Be it known that I, DANIEL C. STOVER, a resident of Freeport, in the county of Stephenson and State of Illinois, have invented certain new and useful Improvements in Wire-Barbing Machines; and I do hereby declare the following to be a full, clear, and exact description of the invention, such as will enable others skilled in the art to which it pertains to make and use the same.

My invention is an improved device for wrapping a barb about a single wire, and is fully described and explained in the following specification, and shown in the accompanying drawings, in which—

Figure 1 is a plan of the entire machine; Figs. 2, 3, 4, and 5, successive front elevations of the working parts of the machine, the bed of the machine being cut away in front of each of the parts shown by a vertical plane, and said cutting planes passing through the lines X Y, U V, W Z, and R S, Fig. 1, respectively; Fig. 6, a front elevation of the same parts shown in Fig. 3, the parts being in the position assumed when the wrapping of a barb is half completed; and Fig. 7, a front elevation, on a larger scale, of the parts shown in Figs. 3 and 6.

In these drawings, A is the bed of the machine; B, the driving-shaft thereof, and C a side shaft connected with the driving-shaft by miter-gears D D'. On the side shaft, C, are rigidly mounted three cams, E F G, the first of which, E, imparts reciprocal rotary motion in a vertical plane to a segmental gear, K, while the second, F, imparts reciprocal longitudinal motion to a forked horizontal bar, *g*; and the third, G, drives a hammer, *k*, whose blows fall on an anvil, J. The cams E G being outside cams, suitable springs are attached to the segment and hammer, respectively, and retract them after each stroke. Near the center of the bed two parallel horizontal shafts, Q T, are journaled in suitable bearings, and two pinions, N L, are rigidly mounted on the rear ends of said shafts. One of said pinions, L, engages with the segmental gear K, and two suitably-mounted gear-wheels, M, engage with each other and with the pinions N L, respectively, so that the reciprocal vertical motion of the segment produces reciprocal rotation of the shafts in opposite directions. On the front ends of the shafts Q T are rigidly attached heads *a a'*, in whose faces are crank-pins *o o'*, which are pivoted in the shanks of two hooked barbing-levers, *b b'*, respectively, the hooks being near the center of the machine, while the shanks extend outward in opposite directions from the center, and pass through holes in bearings *c c'* at the outer edges of the bed. The hooks *b b'* lie in parallel vertical planes, are practically semicircular in form, and are provided with horizontal wrapping-pins *e e'* inserted in the contiguous faces of the hooks at or near their points. The rotation of the shafts Q T rotates the crank-pins *o o'* in circles, and the distance from the crank-pins to the bearings *c c'* is so great that the rotation of the crank-pins moves the wrapping-pins *e e'* in curves, which are practically circles of the same radius as those described by the crank-pins.

Through the center of the machine, midway between the shafts Q T, and parallel therewith, runs the main wire *w*, supported immediately in the rear of the hook *b'* by the perforated post *d*, through which it passes, and immediately in front of the hook *b* by the forked bar *g*, which incloses it during the wrapping of each barb, but is withdrawn at the completion of such wrap. In front of the bar *g*, and at a distance from the wrapping-pins *e e'* equal to the space between two contiguous barbs, the wire passes between the hammer *k* and its anvil J.

The operation of wrapping a barb about the main wire is as follows: The various working parts of the machine being in the positions shown in Figs. 1, 2, 3, 4, 5, and the full lines in Fig. 7, the barb-wire is fed forward by suitable mechanism and passes immediately under the main wire very nearly at right angles thereto, and immediately over the wrapping-pins *e e'*. The barb is then severed at a point between the feeding device and the wrapping-pins, the segment K is moved upward rotating the pinions N L, shafts Q T, and crank-pins *o o'* in the directions indicated by the arrows in Fig. 3, and the wrapping-pins *e e'* are moved in the arcs of circles parallel to those described by the crank-pins. At the moment of beginning the wrap the outer or convex faces of the hooks $b$ $b'$ lie on opposite sides of the main wire and in contact with it; but the circular motion referred to carries them about the main wire in a path somewhat eccentric thereto, and through an angular space of nearly three hundred and sixty degrees, and at the end of their revolution they lie on opposite sides of the main wire, with their inner concave faces in contact therewith, as shown by the dotted lines in Fig. 7. In the first half of their course the hooks move upward, wrapping the ends of the barb first upward and then across the main wire, their position at the middle of the wrap being shown in Fig. 6, in which both the wrapping-pins lie above the ends of the barb. In the last half of their revolution the hooks move downward, carrying the ends of the barb first down and then across the wire $w$ to the position shown by dotted lines in Fig. 7. The arcs described by the wrapping-pins are somewhat less than three hundred and sixty degrees each, and at the completion of the wrap the pins lie somewhat lower and nearer the main wire than at its beginning, so that the ends of the barb lie in oblique planes inclined downward at a small angle from the horizontal. The main wire is then fed forward, carrying the barb with it until the latter comes between the hammer K and anvil J, when a blow of the hammer brings the points of the barb into line, completes the wrap, and finishes the barb.

From the drawings and the foregoing description it is evident that at the completion of a barb each of the working parts retraces the path through which it has passed in forming the barb and resumes the position in which it stood at the beginning of the wrap.

No devices for feeding the wires or for severing the barb are shown, as any ordinary forms may be used with this machine.

Having now described my invention, what I claim as new, and desire to secure by Letters Patent, is—

1. In a wire-barbing machine, the combination of means for supporting a main wire to be barbed, a hooked barbing-lever provided near its point with a wrapping-pin parallel to the main wire, and means, substantially as shown and described, for carrying said wrapping-pin around or partially around said main wire, in a plane at right angles thereto.

2. In a wire-barbing machine, the combination of means for supporting a main wire, two hooked barbing-levers lying in parallel planes at right angles to the main wire, and provided near their points with wrapping-pins in their contiguous faces, and means, substantially as shown and described, for carrying said wrapping-pins around or partially around said main wire in opposite directions.

3. In a wire-barbing machine, the combination of means for supporting a main wire, two hooked barbing-levers lying in parallel planes at right angles thereto, and provided with wrapping-pins in their contiguous faces, two suitably-journaled shafts parallel to and preferably equidistant from the main wire, and provided with crank-pins attached to their end faces and pivoted to the shanks of said hooks, and means for rotating said shafts in opposite directions, whereby said wrapping-pins are carried around said main wire in opposite directions, substantially as shown and described, and for the purpose set forth.

4. The combination of means for supporting a main wire, $w$, the hooked barbing-levers $b$ $b'$, and wrapping-pins $e$ $e'$ thereto attached, the spindle $d$, supporting said main wire immediately in rear of said hooks, the forked bar $g$, adapted to support said main wire immediately in front of said hooks during the wrapping of each barb thereon, and means, substantially as shown and described, for withdrawing said forked bar at the end of each wrap, substantially as shown and described, and for the purpose set forth.

In testimony whereof I have signed this specification in the presence of two subscribing witnesses.

DANIEL C. STOVER.

Witnesses:
R. H. WILES,
OSCAR TAYLOR.